United States Patent [19]

Hari et al.

[11] Patent Number: 4,992,495

[45] Date of Patent: Feb. 12, 1991

[54] PROCESS FOR COLORING HIGH-MOLECULAR WEIGHT ORGANIC MATERIAL USING AMINE SALTS OF AZO PIGMENTS BASED ON PYRAZOLONE DERIVATIVES

[75] Inventors: Stefan Hari, Villars-sur-Glane; Georg Cseh, Posat, both of Switzerland

[73] Assignee: Ciba-Geigy Corporation, Ardsley, N.Y.

[21] Appl. No.: 207,414

[22] Filed: Jun. 16, 1988

Related U.S. Application Data

[63] Continuation of Ser. No. 20,059, Feb. 27, 1987, abandoned.

[30] Foreign Application Priority Data

Mar. 10, 1986 [CH] Switzerland ............... 961/86

[51] Int. Cl.$^5$ .............. D06P 1/44; D06P 5/00; C09B 29/03; C09B 29/10
[52] U.S. Cl. .................... 524/106; 8/512; 8/513; 8/515; 8/517; 8/519; 8/508; 534/589; 534/728; 534/784; 534/793; 106/176
[58] Field of Search ........... 534/728, 784, 793; 8/512, 513, 515, 517, 519, 508; 524/106

[56] References Cited

U.S. PATENT DOCUMENTS

| | | | |
|---|---|---|---|
| 839,605 | 12/1906 | Kuchenbecker | 534/784 |
| 901,675 | 10/1908 | Boniger | 534/784 |
| 2,490,703 | 12/1949 | Paige | 534/728 |
| 2,842,537 | 7/1958 | Strobel et al. | 534/784 |
| 3,671,254 | 6/1972 | Dostes | 534/728 X |
| 3,770,638 | 11/1973 | Chechak | 534/728 X |
| 3,802,836 | 4/1974 | Speck | 534/784 X |
| 4,388,115 | 6/1983 | Sugiyama et al. | 534/793 X |
| 4,594,411 | 6/1986 | Henning | 534/784 |

FOREIGN PATENT DOCUMENTS

| | | | |
|---|---|---|---|
| 0225553 | 6/1987 | European Pat. Off. | 534/784 |
| 2616981 | 10/1977 | Fed. Rep. of Germany | 534/784 |
| 763555 | 12/1956 | United Kingdom | 534/728 |
| 1286770 | 8/1972 | United Kingdom | |
| 1410862 | 10/1975 | United Kingdom | 534/784 |
| 1490139 | 10/1977 | United Kingdom | 534/784 |

*Primary Examiner*—Floyd D. Higel
*Assistant Examiner*—Fiona T. Powers
*Attorney, Agent, or Firm*—Luther A. R. Hall

[57] ABSTRACT

Compounds of formula

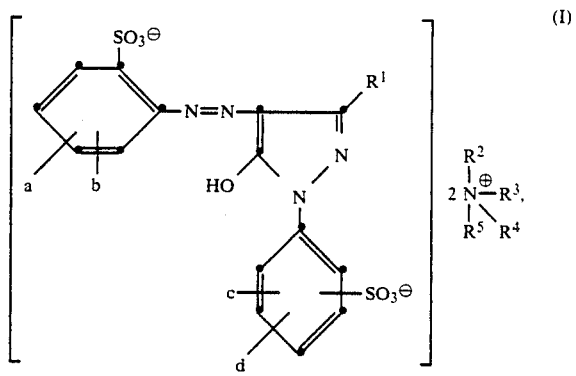

(I)

wherein a and b are each independently of the other halogen, $-CH_3$, $-C_2H_5$, $-OCH_3$, $-OC_2H_5$ or the group of formula $-NHCO-C_1-C_4$alkyl, c and d are each independently of the other hydrogen, halogen, $-CH_3$, $-C_2H_5$, $-OCH_3$, $-OC_2H_5$ or the group of formula $-NHCO-C_1-C_4$alkyl, and $R^1$ is $-CH_3$, phenyl, $-COOCH_3$, $-COOC_2H_5$, $-NHCO-C_1-C_4$alkyl or $-CONH-C_1-C_4$alkyl, and $R^2$, $R^3$, $R_4$ and $R_5$ are each independently hydrogen, $C_1-C_4$alkyl, unsubstituted or substituted by a chlorine atom or a $-OH$ group, or are $C_7-C_9$aralkyl, $C_5-C_8$cycloalkyl, phenyl or phenyl which is substituted by 1 to 3 halogen atoms or methyl or methoxy groups, or is a heterocyclic radical of the benzimidazole, benzoxazole, benzthiazole or pyridine series, or $R^3$ and $R^4$, together with the linking nitrogen atom, are a pyrrolidine, imidazolidine, piperidine, piperazine or morpholine radical, or $R^3$, $R^4$ and $R^5$, together with the linking nitrogen atom, are a pyrrole, pyridine, picoline, pyrazine, quinoline or isoquinoline radical, are most suitable for coloring high molecular organic material.

4 Claims, No Drawings

PROCESS FOR COLORING HIGH-MOLECULAR WEIGHT ORGANIC MATERIAL USING AMINE SALTS OF AZO PIGMENTS BASED ON PYRAZOLONE DERIVATIVES

This is a continuation of application Ser. No. 020,059, filed on Feb. 27, 1987, now abandoned.

The present invention relates to novel amine salts of azo compounds, to the preparation thereof, and to the use thereof of coloring high molecular organic material.

Amine salts of azo compounds are known in the art. Thus, for example, ammonium salts of sulfonated azo dyes of the pyrazolone series are disclosed in European patent application 0 073 972. Such compounds are used as pigments for coloring plastics materials.

Specifically, the present invention relates to compounds of formula

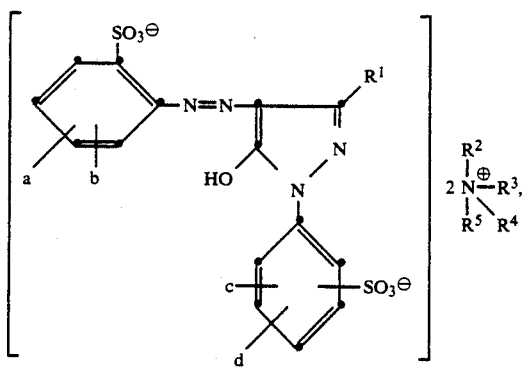
(I)

wherein a and b are each independently of the other halogen, —CH$_3$, —C$_2$H$_5$, —OCH$_3$, —OC$_2$H$_5$ or the group of formula —NHCO—C$_1$-C$_4$alkyl, c and d are each independently of the other hydrogen, halogen, —CH$_3$, —C$_2$H$_5$, —OCH$_3$, —OC$_2$H$_5$ or the group of formula —NHCO—C$_1$-C$_4$alkyl, and R$^1$ is —CH$_3$, phenyl, —COOCH$_3$, —COOC$_2$H$_5$, —NHCO—C$_1$-C$_4$alkyl or —CONH—C$_1$-C$_4$alkyl, and R$^2$, R$^3$, R$^4$ and R$^5$ are each independently hydrogen, C$_1$-C$_4$alkyl, unsubstituted or substituted by a chlorine atom or a —OH group, or are C$_7$-C$_9$aralkyl, C$_5$-C$_8$cycloalkyl, phenyl or phenyl which is substituted by 1 to 3 halogen atoms or methyl or methoxy groups, or is a heterocyclic radical of the benzimidazole, benzoxazole, benzthiazole or pyridine series, or R$^3$ and R$^4$, together with the linking nitrogen atom, are a pyrrolidine, imidazolidine, piperidine, piperazine or morpholine radical, or R$^3$, R$^4$ and R$^5$, together with the linking nitrogen atom, are a pyrrole, pyridine, picoline, pyrazine, quinoline or isoquinoline radical.

The C$_1$-C$_4$alkyl moiety of —NHCO—C$_1$-C$_4$alkyl and —CONH—C$_1$-C$_4$alkyl radicals may be methyl, ethyl, n-propyl, isopropyl, n-butyl and tert-butyl, with methyl being preferred.

Halogen by itself as a, b, c and d and as substituent R$^2$, R$^3$, R$^4$ and R$^5$ of phenyl is fluorine, chlorine, bromine or iodine, with chlorine or bromine being preferred and chlorine most preferred.

R$^2$, R$^3$, R$^4$ and R$^5$ as C$_1$-C$_4$alkyl may be methyl, ethyl, n-propyl, isopropyl, n-butyl and tert-butyl.

C$_1$-C$_4$Alkyl substituted by a chlorine atom or a —OH group may be β-chloroethyl or 2-hydroxyethyl.

R$^2$, R$^3$, R$^4$ and R$^5$ as C$_7$-C$_9$aralkyl may be benzyl or ethylphenyl.

C$_5$-C$_8$Cycloalkyl may be cyclopentyl, cyclohexyl, cycloheptyl or cyclooctyl.

Heterocyclic radicals of the benzimidazole, benzoxazole, benzthiazole and pyridine series are e.g. radicals derived from 5-aminobenzimidazole, 5-amino-2-methylbenzimidazole, 5-aminobenzoxazole, 5-aminobenzthiazole, 2-amino-6-ethoxybenzthiazole, 2-aminobenzimidazole, and 2-, 3- or 4-aminopyridine.

Particularly preferred compounds of formula I are those wherein a and b are each independently of the other —Cl, —Br, —CH$_3$ or —OCH$_3$, c and d are each independently of the other hydrogen, —Cl, —Br, —CH$_3$ or —OCH$_3$, R$^1$ is —CH$_3$, —COOC$_2$H$_5$, —CONHCH$_3$ or —NHCOCH$_3$, and R$^2$, R$^3$, R$^4$ and R$^5$ are each independently hydrogen or —CH$_3$.

The most preferred compounds of formula I are those wherein a and b are each independently of the other —Cl or —CH$_3$, c and d are each independently of the other hydrogen, —Cl or —CH$_3$, R$^1$ is —CH$_3$ and R$^2$, R$^3$, R$^4$ and R$^5$ are hydrogen.

The compounds of formula I are prepared, for example, by reacting a diazo compound of an amine of formula II

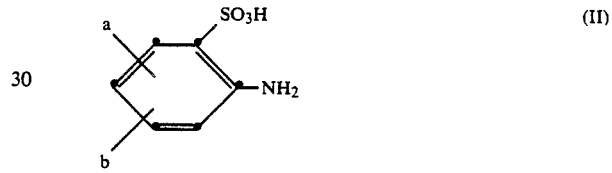
(II)

with a coupling component of formula III

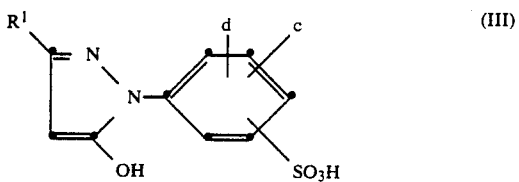
(III)

under reactions which are known per se, and subsequently treating the reaction product, which is preferably in the form of the free disulfonic acid, with a compound of formula IV $$N^{\oplus}(R^2)(R^3)(R^4)(R^5) \qquad (IV)$$

in the form of its chloride or sulfate, in which formulae II, III and IV above a, b, c, d, R$^1$ and R$^2$ to R$^5$ are as defined above.

Instead of the chloride or sulfate of this compound, it is also possible to use the free compound.

A variant of the process comprises carrying out the diazotisation and coupling steps without using an inorganic acid by mixing the amine of formula II and the coupling component of formula III, in water or in an organic solvent, with the stoichiometric amount of a nitrite, e.g. NaNO$_2$, and converting the resultant azo compound into the compound of formula I by conventional methods.

Examples of amines of formula II are: 2-amino-3-methyl-5-chlorobenzenesulfonic acid, 2-amino-3,4-dichlorobenzenesulfonic acid, 2-amino-3,5-dichlorobenzenesulfonic acid, 2-amino-3,5-dimethylbenzenesulfonic acid, 2-amino-4,5-dimethylbenzenesulfonic acid, 2-amino-4-chloro-5-acetylaminobenzenesulfonic acid, 2-amino-4-methoxy-5-acetylaminobenzenesulfonic acid, 2-amino-4-chloro-5-methylbenzenesulfonic acid, 2-amino-4-methyl-5-chlorobenzenesulfonic acid, 2-amino-4,5-dichlorobenzenesulfonic acid, 2-amino-4-chloro-5-methoxybenzenesulfonic acid.

Examples of coupling components of formula III are:
1-(2'-sulfophenyl)-3-methyl-5-pyrazolone;
1-(4',5'-dichloro-2'-sulfophenyl)-3-methyl-5-pyrazolone,
1-(3'-sulfophenyl)-3-methyl-5-pyrazolone,
1-(6'-chloro-3'-sulfophenyl)-3-methyl-5-pyrazolone,
1-(4'-sulfophenyl)-3-methyl-5-pyrazolone,
1(2'-chloro-6'-methyl-4'-sulfophenyl)-3-methyl-5-pyrazolone,
1-(2'-methyl-4'-sulfophenyl)-3-methylpyrazolone,
1-(2',5'dichloro-4'-sulfophenyl)-3-methylpyrazolone,
1-(3'-sulfophenyl)-3-carbomethoxy-5-pyrazolone,
1-(2',5,-dichloro-4'-sulfophenyl)-3-carbomethoxy-5-pyrazolone,
1-(3'-sulfophenyl)-3-carboethoxy-5-pyrazolone,
1-(2',5'-dichloro-4'-sulfophenyl)-3-carboethoxy-5-pyrazolone,
1-(3'-sulfophenyl)-3-(N-methylcarbamyl)-5-pyrazolone,
1-(3'-sulfophenyl)-3-acetylamino-5-pyrazolone,
1-(2',5'-dichloro-4'-sulfophenyl)-3-acetylamino-5-pyrazolone.

Examples of free compounds of formula IV are: ammonia, methylamine, ethylamine, n-propylamine, n-butylamine, cyclohexylamine, benzylamine, aniline, 2-chloroaniline, 2-, 3- or 4-methylaniline, 2,4-dimethylaniline, 2,4,6-trimethylaniline, dimethylamine, trimethylamine, tetramethylamine, 2-, 3- or 4-aminopyridine, morpholine, piperidine, 2-, 3- or 4-picoline as well as pyridine.

The compounds of formula I can be used as pigments for coloring high molecular organic material. They can normally be used direct in the form in which they are obtained in their synthesis. Depending on the envisaged utility, the compounds of formula I can be converted into a more opaque or more transparent form.

If it is desired to obtain a more opaque pigment form, then it is usually expedient to effect a thermal aftertreatment in water or an organic solvent, under normal or elevated pressure. It is preferred to use organic solvents such as benzenes which are substituted by halogen atoms, alkyl or nitro groups, for example xylenes, chlorobenzene, o-dichlorobenzene or nitrobenzene, as well as pyridine bases such as pyridine, picoline or quinoline, and also ketones such as cyclohexanone, alcohols such as isopropanol, butanols or pentanols, ethers such as ethylene glycol monomethyl or monoethyl ether, amides such as dimethylformamide or N-methylpyrrolidone, as well as dimethylsulfoxide or sulfolane. The aftertreatment can also be carried out in water, under normal or elevated pressure, in the presence of organic solvents and/or with the addition of surfactants.

Examples of high molecular organic materials which may be colored with the compounds of formula I are cellulose ethers and esters such as ethyl cellulose, nitrocellulose, cellulose acetate, cellulose butyrate, natural resins or synthetic resins such as polymerization resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

The compounds of formula I are particularly suitable for coloring polyvinyl chloride and polyolefins such as polyethylene and polypropylene.

The above high molecular organic compounds may be singly or as mixtures in the form of plastics, melts or of spinning solutions, varnishes, paints or printing inks. Depending on the utility, it is advantageous to use the compounds of formula I as toners or in the form of preparations.

The compounds of formula I are preferably employed in an amount of 0.01 to 30% by weight, preferably 0.1 to 10% by weight, based on the high molecular organic material to be pigmented.

The pigmenting of the high molecular organic compounds with the compounds of formula I is carried out for example by incorporating such a compound, optionally in the form of a masterbatch, into the substrates using roll mills, mixing or grinding machines. The pigmented material is then brought into the desired final form by methods which are known per se, for example calendering, moulding, extruding, coating, spinning, casting or by injection moulding. It is often desirable to incorporate plasticizers into the high molecular compounds before processing in order to produce non-brittle mouldings or to diminish their brittleness. Suitable plasticizers are for example esters of phosphoric acid, phthalic acid or sebacic acid. The plasticizers may be incorporated before or after working the compound of formula I into the polymers. To obtain different shades, it is also possible to add fillers or other chromophoric components such as white, colored or black pigments, in any amount, to the high molecular organic compounds, in addition to the compounds of formula I.

For pigmenting varnishes and printing inks, the high molecular organic materials and the compounds of formula I, together with optional additives such as fillers, other pigments, siccatives or plasticizers, are finely dispersed or dissolved in a common organic solvent or mixture of solvents. The procedure may be such that the individual components by themselves, or also several jointly, are dispersed or dissolved in the solvent and subsequently all the components are mixed.

The colorations obtained, for example, in polyvinyl chloride or polyolefins with the compounds of formula I, have good allround fastness properties such as good dispersibility, high tinting strength and purity, good fastness to migration, heat, light, and weathering, as well as good hiding power.

In the following Examples, parts and percentages are by weight.

EXAMPLE 1

5.2 g of the azo compound of the formula

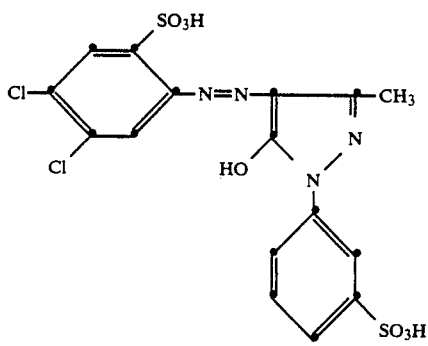

(obtainable by known methods) are dissolved at room temperature in a mixture of 50 ml of acetic acid and 50 ml of deionized water. To the clear, dark red solution is added, over 2 minutes, a solution of 2.6 g of aniline hydrochloride in 10 ml of distilled water. The resultant orange yellow suspension is stirred for 3 hours at room temperature and filtered. The filter residue is washed with 100 ml of deionized water and vacuum dried at 60° C., affording 5.1 g of a deep orange powder of formula

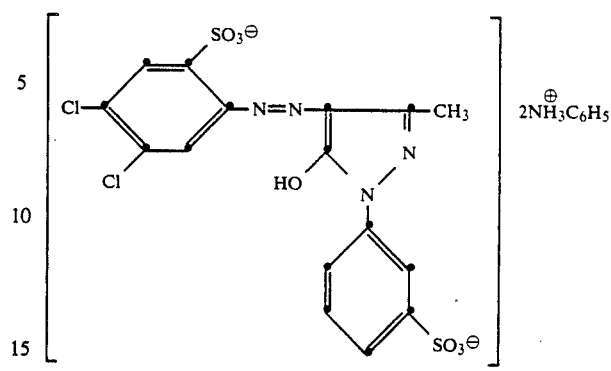

Analysis: theory (in %): C 48.49, H 3.78; Cl 10.22; N 12.11; S 9.24; found (in %): C 48.32; H 3.87; Cl 10.46; N 12.20; S 8.90.

This compound colors polyvinyl chloride and polyethylene in strong, fast yellow shades.

Instead of using aniline hydrochloride, it is possible to use other amine hydrochlorides listed in the following table to give the compounds of formula

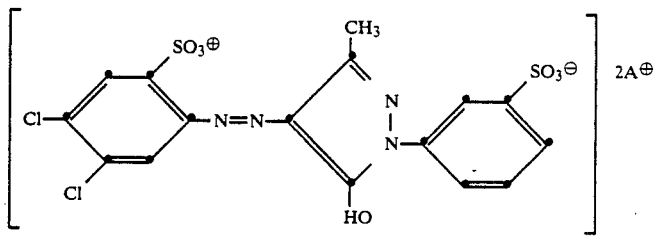

in accordance with the process conditions described in this Example.

| Example | Amine hydrochloride | A | Shade in soft PVC (0.2% of pigment) |
|---|---|---|---|
| 2 | ammonium chloride | $NH_4^\oplus$ | yellow |
| 3 | methylamine hydrochloride | $H_3\overset{\oplus}{N}CH_3$ | orange yellow |
| 4 | benzylamine hydrochloride | $H_3\overset{\oplus}{N}-CH_2C_6H_5$ | yellow |
| 5 | trimethylamine hydrochloride | $\overset{\oplus}{H}N(CH_3)_3$ | yellow |
| 6 | tetramethylammonium chloride | $N(CH_3)_4$ | greenish yellow |
| 7 | 2,5-dimethylaniline hydrochloride | ![2,5-dimethylanilinium] | yellow |
| 8 | pyridine hydrochloride | ![pyridinium] | yellow |
| 9 | 2-hydroxyethyl hydrochloride | $H_3\overset{\oplus}{N}CH_2CH_2-OH$ | yellow |
| 10 | cyclohexylamine hydrochloride | ![cyclohexylammonium] | yellow |

-continued

| Example | Amine hydrochloride | A | Shade in soft PVC (0.2% of pigment) |
|---------|---------------------|---|-------------------------------------|
| 11 | morpholine hydrochloride | $H_2\overset{\oplus}{N}$—(ring with H, O) | yellow |
| 12 | 2-aminopyridine hydrochloride | pyridine ring with $\overset{\oplus}{N}H_3$ | yellow |
| 13 | 6-amino-benzthiazole hydrochloride | $H_3\overset{\oplus}{N}$—(benzothiazole with N, S, H) | yellow |
| 14 | 5-amino-2-methylbenzimidazole hydrochloride | $H_3\overset{\oplus}{N}$—(benzimidazole with N, NH, $CH_3$) | yellow |

EXAMPLE 15

15.4 g of 36% disodium salt of the azo compound used in Example 1 and 4.4 g of ammonium chloride are heated to 80° C. in 100 ml of deionized water. The deep yellow suspension is stirred for 4 hours at this temperature, cooled to room temperature and filtered. The filter residue is washed with a small amount of deionized water and vacuum dried at 60° C., affording 5.1 g (94.2% of theory) of a product that is identical structurally and in all properties with the pigment obtained in Example 2. In analogous manner, further compounds of formula I can be prepared starting from an amine of formula II, a coupling component of formula III and an amine of formula IV, as listed in the following table.

| Example | Amine of formula II | Coupling component of formula III | Amine of formula IV | Shade in soft PVC (0.2% of pigment) |
|---------|---------------------|-----------------------------------|---------------------|-------------------------------------|
| 16 | $NH_2$-, $SO_3H$-, $H_3C$-, $Cl$- substituted benzene | $CH_3$, $HO$, $N$, $N$-phenyl-$SO_3H$ pyrazolone | $NH_3$ | yellowish orange |

-continued

| Example | Amine of formula II | Coupling component of formula III | Amine of formula IV | Shade in soft PVC (0.2% of pigment) |
|---|---|---|---|---|
| 17 | 2-amino-5-chloro-4-methylbenzenesulfonic acid | 1-(4-sulfophenyl)-3-methyl-5-hydroxypyrazole | CH₃NH₂ | yellowish orange |
| 18 | 2-amino-5-chloro-4-methylbenzenesulfonic acid | 1-(4-sulfophenyl)-3-methyl-5-hydroxypyrazole | NH₃ | yellow |
| 19 | 2-amino-5-chloro-4-methylbenzenesulfonic acid | 1-(4-sulfophenyl)-3-methyl-5-hydroxypyrazole | CH₃NH₂ | yellow |
| 20 | 2-amino-4,5-dimethylbenzenesulfonic acid | 1-(4-sulfophenyl)-3-methyl-5-hydroxypyrazole | NH₃ | orange yellow |
| 21 | 2-amino-5-chloro-4-methoxybenzenesulfonic acid | 1-(3-sulfophenyl)-3-methyl-5-hydroxypyrazole | NH₃ | orange yellow |

-continued
| Example | Amine of formula II | Coupling component of formula III | Amine of formula IV | Shade in soft PVC (0.2% of pigment) |
|---|---|---|---|---|
| 22 | 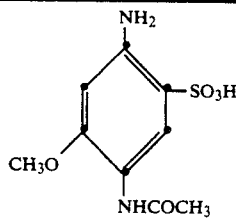 | 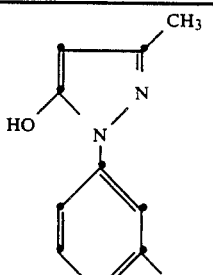 | NH$_3$ | orange |
| 23 | 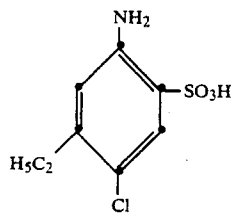 | 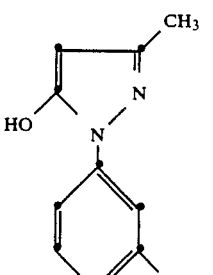 | NH$_3$ | yellow |
| 24 | 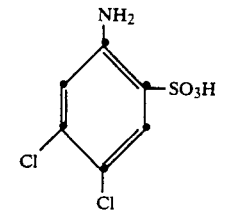 | 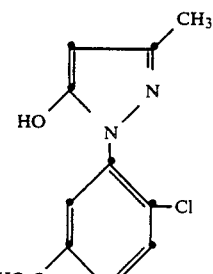 | NH$_3$ | greenish yellow |
| 25 | 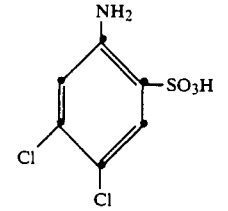 | 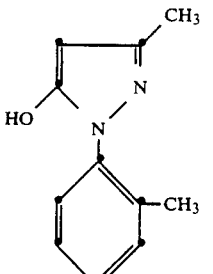 | NH$_3$ | greenish yellow |
| 26 | 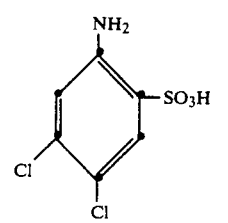 | 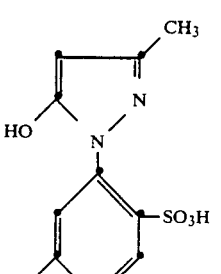 | NH$_3$ | greenish yellow |

-continued

| Example | Amine of formula II | Coupling component of formula III | Amine of formula IV | Shade in soft PVC (0.2% of pigment) |
|---|---|---|---|---|
| 27 | 4,5-dichloro-2-aminobenzenesulfonic acid | 1-(2,5-dimethoxy-4-sulfophenyl)-3-methyl-5-hydroxypyrazole | $NH_3$ | greenish yellow |
| 28 | 4,5-dichloro-2-aminobenzenesulfonic acid | 1-(2,5-dichloro-4-sulfophenyl)-3-methyl-5-hydroxypyrazole | $NH_3$ | greenish yellow |
| 29 | 4,5-dichloro-2-aminobenzenesulfonic acid | 1-(3-sulfophenyl)-3-ethoxycarbonyl-5-hydroxypyrazole | $NH_3$ | yellow |
| 30 | 4,5-dichloro-2-aminobenzenesulfonic acid | 1-(3-sulfophenyl)-3-(N-methylcarbamoyl)-5-hydroxypyrazole | $CH_3NH_2$ | orange |
| 31 | 4,5-dichloro-2-aminobenzenesulfonic acid | 1-phenyl-3-acetamido-5-hydroxypyrazole | $NH_3$ | yellow |

EXAMPLE 32

13 g of 93% 2-amino-4,5-dichlorobenzenesulfonic acid are dissolved in 90 ml of deionised water and 5.7 ml of 25% ammonia solution. Then 27.5 ml of 23.5% hydrochloric acid are added to the clear, reddish violet solution. The resultant thick, white suspension is cooled to 5° C. and 12.5 ml of 4 N sodium nitrite solution are then added over 5 minutes. Then 15.5 g of 90.1% 1-(3'-sulfophenyl)-3-methyl-5-pyrazolone in the form of a fine suspension in 100 ml of deionized water are added dropwide over 5 minutes to the slightly beige-colored suspension. The pH of the resultant pale yellow suspension is adjusted to 6.5 with 15.5 ml of 25% ammonia solution. The now orange-colored suspension is stirred for 3 hours, during which time the temperature of the suspension rises from 5° to 22° C. When coupling is complete, this suspension is heated to 80° C., stirred for 6 hours at this temperature, then cooled to room temperature and filtered. The filter residue is washed with a small amount of deionized water and vacuum dried at 60° C., affording 26.9 g (99.5% of theory) of a product which is identical with that of Example 2.

EXAMPLE 33

5.2 g of the azo compound used in Example 1 (disulfonic acid) are dissolved at 70° C. in 150 ml of deionised water. Then 1.85 g of aniline are added to the clear, red solution. The resultant orange suspension is stirred for 2 hours without heating and then filtered. The residue is washed with 100 ml of deionized water and vacuum dried at 60° C., affording 5.6 g (80.8% of theory) of an orange product that is identical in structure and all properties with the pigment obtained in Example 1.

What is claimed is:

1. A process for mass coloring high molecular weight organic material selected from the group consisting of cellulose ethers, cellulose esters, aminoplasts, alkyd resins, phenolic plastics, polycarbonates, polyolefins, polystyrene, poly(vinyl chloride), polyamides, polyurethanes, polyesters, rubber, casein, silicone resins and mixtures thereof, which process comprises incorporating into said organic material an effective coloring amount of a pigment of formula I

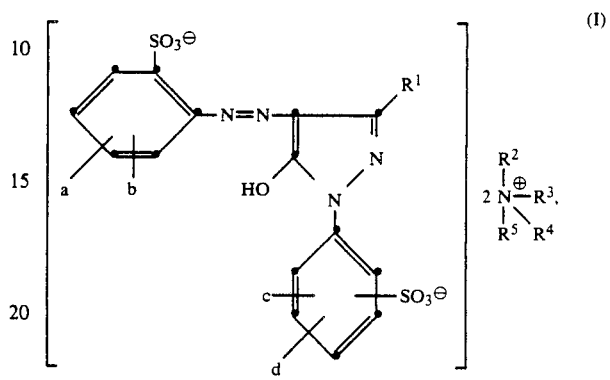

wherein a and b are each —Cl, c and d are each independently of the other hydrogen, —Cl or —CH$_3$, R$^1$ is —CH$_3$, and R$^2$, R$^3$, R$^4$ and R$^5$ are each hydrogen.

2. A process according to claim 1 where the pigment of formula I, c and d are each hydrogen.

3. A process according to claim 1 wherein the high molecular weight organic material is poly(vinyl chloride) or polyolefin.

4. A high molecular weight material colored according to the process of claim 1.

* * * * *